United States Patent
Stolte

(10) Patent No.: US 6,970,237 B1
(45) Date of Patent: Nov. 29, 2005

(54) REFLECTOMETRIC INSERTION LOSS MEASUREMENTS FOR OPTICAL COMPONENTS

(75) Inventor: Ralf Stolte, Hamburg (DE)

(73) Assignee: Agilent Technologies Inc., Palo Alto, CA (US)

( * ) Notice: Subject to any disclaimer, the term of this patent is extended or adjusted under 35 U.S.C. 154(b) by 144 days.

(21) Appl. No.: 10/297,857

(22) PCT Filed: Jul. 21, 2000

(86) PCT No.: PCT/EP00/07021

§ 371 (c)(1),
(2), (4) Date: Jul. 16, 2003

(87) PCT Pub. No.: WO02/08718

PCT Pub. Date: Jan. 31, 2002

(51) Int. Cl.[7] .............................. G01N 21/00
(52) U.S. Cl. ................................... 356/73.1
(58) Field of Search .................. 356/73.1; 385/134, 385/100; 250/227.1–227.28

(56) References Cited

U.S. PATENT DOCUMENTS

| | | | |
|---|---|---|---|
| 4,685,799 A | 8/1987 | Brininstool | 356/73.1 |
| 5,179,420 A | 1/1993 | So et al. | 356/73.1 |
| 5,625,450 A | 4/1997 | Ikeno | 356/73.1 |
| 5,754,284 A | 5/1998 | Leblanc et al. | 356/73.1 |
| 5,764,348 A | 6/1998 | Bloom | 356/73.1 |
| 6,459,478 B1 * | 10/2002 | Schmidt et al. | 356/73.1 |

FOREIGN PATENT DOCUMENTS

| | | |
|---|---|---|
| DE | 19625490 A1 | 2/1997 |
| EP | 0959337 A2 | 11/1999 |
| EP | 0872721 B1 | 5/2001 |
| EP | 0926479 B1 | 10/2001 |

OTHER PUBLICATIONS

Patent Abstracts of Japan publication No. 07-083795.
Patent Abstracts of Japan publication No. 10-062308.

* cited by examiner

Primary Examiner—Tu T. Nguyen

(57) ABSTRACT

For determining an insertion loss ($L_{DUT}$) of an optical component (20) having one or more connections (C1, C2), a connection insertion loss ($L_{C1}$, $L_{C2}$) is determined for one or more of the connections (C1, C2) by means a reflectometric measurement, and a total insertion loss ($L_{total}$) of the optical component (20) is determined together with its one or more connections (C1, C2). The insertion loss ($L_{DUT}$) of the optical component (20) can then be determined from the determined total insertion loss ($L_{total}$) and each determined connection insertion loss ($L_{C1}$, $L_{C2}$).

9 Claims, 1 Drawing Sheet

REFLECTOMETRIC INSERTION LOSS MEASUREMENTS FOR OPTICAL COMPONENTS

BACKGROUND OF THE INVENTION

The present invention relates to determining insertion loss of an optical component.

Optical components are used in advanced optical networks and normally undergo comprehensive tests during manufacturing. Components which are likely to be coupled in concatenation connection in a large number (for example in submarine applications) have the particular requirements that their insertion loss has to be characterized with high accuracy, such as 10 mdB or even better. Those components are typically pigtailed, i.e. provided with an optical fiber at the input and/or output for optically coupling to the components, and need to be connected to a testing instrument for characterization.

The problem, however, arises that the uncertainty introduced in a measurement if a fiber optic connector or a bare fiber connection is being used might by far exceed the required accuracy for the characterization. Typical solutions for addressing this problem are either to simply adapt the specification of the optical component to the limited measuring accuracy, or to minimize the insertion loss resulting from optical connections to optical component. In the former case, the specifications of the optical component usually contain the uncertainties of the connection to and from the optical component. In the latter case, the (e.g. pigtailed) fiber connections of the optical component are usually spliced in the lead fibers of the measurement instrument. Such splicing connections can be reproduced with very low losses and uncertainties. This, however, has the disadvantage that this splicing process takes additional time, and also some lengths of the pigtailed fiber connection of the optical component is being consumed for each splicing.

SUMMARY OF THE INVENTION

It is an object of the present invention to provide an improved measurement of insertion loss of an optical component. The object is solved by the independent claims. Preferred embodiments are shown by the dependent claims.

According to the invention, a reflectometric measurement is applied allowing determining a spatial resolution along the optical component to be measured. As well known in the art, those reflectometric measurements provide an optical stimulus signal and measure, in return, a reflected and/or backscattered signal in response to the stimulus signal (e.g. Raleigh and/or Raman scattering), as described e.g. the book 'Fiber Optic Test and Measurement' by Derickson Dennis, 1998, ISBN 0-13-534330, in particular in chapter 11 thereof. Analyzing the received reflected and/or backscattered signal (which shall be referred to in the following as response signal) allows to conclude to the spatial characteristic of the insertion loss for the measured fiber path including all optical components coupled thereto.

For determining the insertion loss of a specific optical component to be characterized, the invention provides a reflectometric measurement for determining the insertion loss of each connection of the optical component in the measuring path coupled to and accessible by the reflectometric measurement. The thus reflectometrically determined insertion loss(es) of the connection(s) of the optical component can then be subtracted from a determined total insertion loss of the optical device including the connection(s), thus resulting in an actual insertion loss of the optical component to be measured, excluding the connection(s).

While the total insertion loss of the optical component including its connection(s) might also be determined using the same or a different reflectometric measurement, the measurement accuracy can be significantly improved by determining the total insertion loss by means of a transmission measurement. The transmission measurement determines the total insertion loss by evaluating the ratio of optical signal intensities before and after passing the optical device including its connection(s).

While the reflectometric measurement usually only requires a measurement from one side of the optical component, the transmission measurement requires to measure from both sides of the optical component, i.e. from an input and an output of the optical component. Transmission measurements, however, can be provided with higher accuracy than deriving the transmission loss from a reflectometric measurement, since the power levels are generally much higher and therefore the signal-to-noise ratio much lower in case of transmission. However, transmission measurements can only be provided in total for the optical components together with its connections and do not allow individually analyzing the insertion loss at the connections of the optical components to be measured. Combining the reflectometric and transmission measurement in a way that the reflectometrically determined insertion loss(es) of the connection(s) of the optical component is/are subtracted from the total loss of the optical component determined by means of the transmission measurement thus allows to determine with high accuracy the actual insertion loss of the optical component.

In a preferred embodiment, the insertion loss of the optical component is to be measured for a plurality of different wavelengths, as disclosed e.g. in EP-A-872721 by the same applicant. Generally speaking, the insertion loss of the connections of the optical component is normally relatively independent of the wavelengths in contrast to the actual insertion loss of the optical component. Therefore, it is normally sufficient to determine the insertion losses of the connections of the optical component for one wavelengths representative for a range of different wavelengths, and using those determined representative insertion losses for determining the actual insertion loss of the optical component for that range of wavelengths. This allows to significantly reducing the calculation effort without jeopardizing the improved accuracy as received by applying the insertion loss determination in accordance with the present invention.

The spatially resolved measurement can be provided by any kind of reflectometric measurement as known in the art, in particular by applying optical time domain reflectometry (OTDR), optical frequency domain reflectometry (OFDR), frequency modulated continuos wave reflectometry (FMCW), or optical coherence domain reflectometry (OCDR). The latter is disclosed e.g. by E. Brinkmeyer and R. Ulrich, High-resolution OCDR in dispersive waveguides, Electronics Letters 26, pp. 413–414 (1990).

Typical optical components to be tested in accordance with the present invention can be fiber gratings, circulator, isolators, or other integrated-optical components. Those optical components are usually pigtailed and provide as connections bare fiber connections and/or fiber optic connectors. The invention thus allows reducing or eliminating uncertainty that is introduced by the connections of an optical component to be measured, such as bare fiber connections and/or fiber optic connectors.

It is clear that the invention can be partly or entirely embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

FIG. 1 illustrates the insertion loss measurement according to the present invention, whereby

DETAILED DESCRIPTION OF THE INVENTION

Figures 1A, 1B:
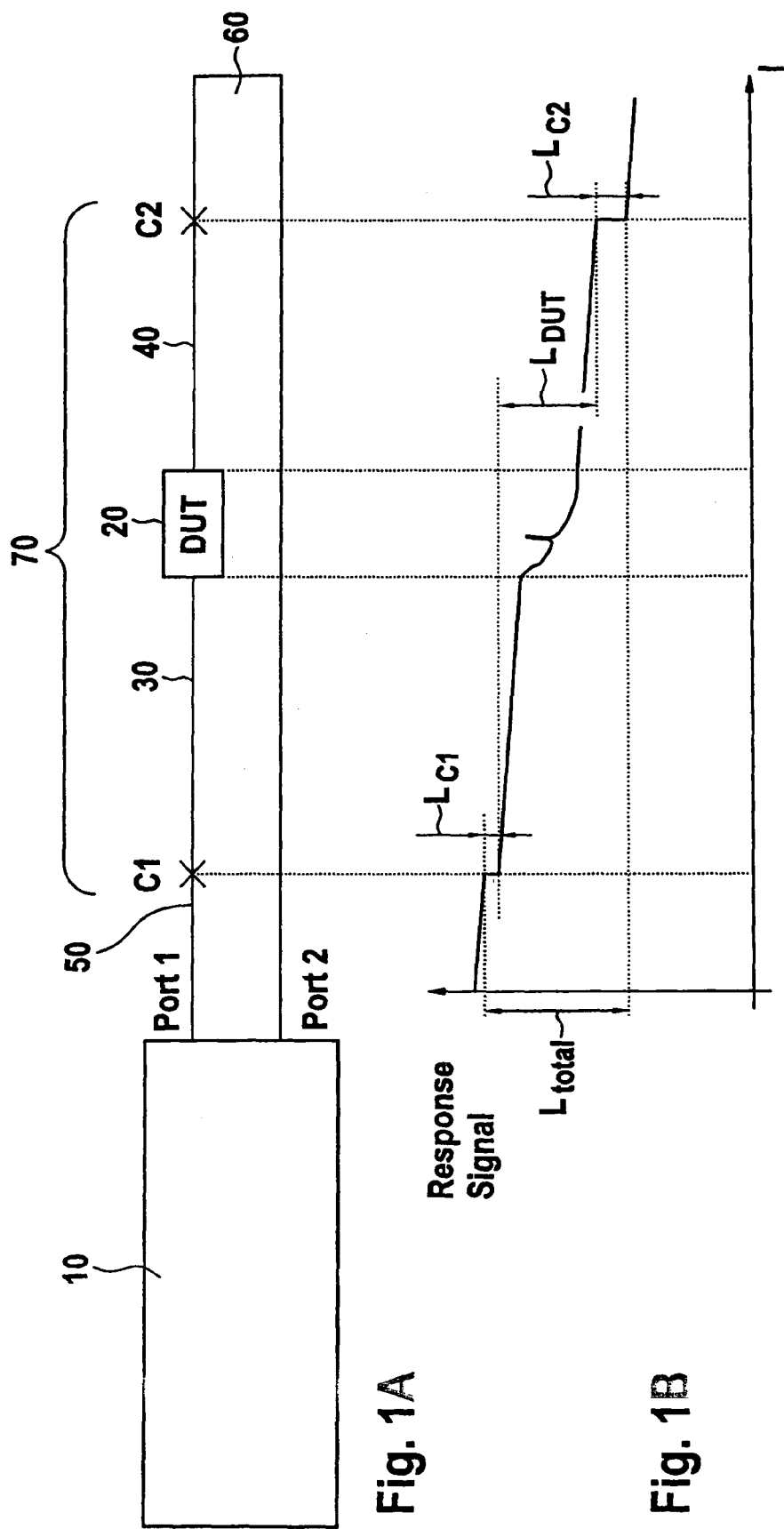
FIG. 1A shows an example of a measurement setup.
FIG. 1B depicts an example of a measuring result received from a reflectometric measurement.

In FIG. 1A, a measurement instrument 10 (here: an optical time domain reflectometer—OTDR) is optically coupled to an optical component as a device under test (DUT) 20. The DUT 20 is pigtailed, i.e. provided with a fiber 30 and a fiber 40, each for optically coupling to the device under test 20. The measurement instrument 10 is coupled from a Port 1 via a fiber 50 to the fiber 30, whereby a connection C1 is provided at the coupling point between the fiber 50 to the fiber 30. The connection C1 thus represents any kind of optical connection from the side of the DUT 20 towards the fiber 50 of the measurement instrument 10, such as a connector provided at the end of the fiber 30 or a spliced fiber connection between the fibers 30 and 50. Accordingly, the measurement instrument 10 is coupled from a Port 2 via a fiber 60 to the fiber 40, whereby a connection C2 is provided at the coupling point between the fibers 60 and 40. The connection C2 thus represents any kind of optical connection from the side of the DUT 20 towards the fiber 60 of the measurement instrument 10, such as a connector provided at the end of the fiber 40 or a spliced fiber connection between the fibers 40 and 60.

The DUT 20 together with the fibers 30 and 40 and the connections C1 and C2 shall represent a total measuring device 70, as it will be 'seen' from outside of the measuring device 70 as being inserted between the fibers 50 and 60.

The measurement instrument 10 provides a reflectometric measurement of the measuring device 70 together with the thereto-connected fibers 50 and 60, and might display the results of that measurement in a so-called ODTR-trace as depicted in FIG. 1B. The ODTR-trace of FIG. 1B shows the power of the reflected and/or backscattered response signal versus a distance I relative from the measurement instrument 10. The backscatter generally is due to Raleigh and/or Raman scattering in the fiber path between Port 1 and Port 2. The OTDR-trace as shown in FIG. 1B assumes that the measurement stimulus signal was launched from the Port 1.

An insertion loss $L_{C1}$ of the connection C1 can be derived from the ODTR-trace of FIG. 1B by determining the difference between the measured response signal to the left and to the right of the connection C1. Accordingly, an insertion loss $L_{C2}$ can be determined by the difference in the response signal to the left and to the right of the connection C2. Details on how to determine insertion losses at such kind of connections are disclosed e.g. in chapter 11 of the aforementioned book 'Fiber Optic Test and Measurement'.

An insertion loss $L_{total}$ of the measuring device 70 can be determined from the ODTR-trace as depicted in FIG. 1B by the difference in the response signal at the left side of the connection C1 and at the right side of the connection C2. In a preferred embodiment, the insertion loss $L_{total}$ is determined by a transmission measurement, whereby the measurement instrument 10 determines an optical output power for the measuring device 70 at (the right side of) the connection C2 and an input power for the measuring device 70 at the (left side of) the connection C1. The ratio between the determined outside power and the determined inside power thus represents the insertion loss $L_{total}$.

It is clear that by keeping the fibers 50 and 60 sufficiently short, their insertion loss can be neglected, so that the optical power at the Port 1 represents the optical power at the connection C1, and the optical power at the Port 2 represents the optical power at the connection C2.

Preferably, in order to obtain high accuracy insertion loss measurement, the output power from Port 1 and the sensitivity of Port 2 have to be known. This is typically done by referencing, i.e. connecting the fiber 50 directly with the fiber 60 and storing the power value that has been received in Port 2. In this reference measurement the connection between the fibers 50 and 60 introduces new uncertainties. These also may be eliminated by using a reflectometric measurement scheme that allows to spatially resolve the losses.

It is to be understood that the insertion losses of the fibers 50, 30, 40 and 60 are somehow exaggerated in FIG. 1B in order to illustrate the principal effect of those fibers. In most practical applications, the fibers 50, 30, 40 and 60 will be sufficiently short in length, so that their contribution to the insertion loss can be neglected.

For determining an insertion loss $L_{DUT}$ (including the fibers 30 and 40 but excluding the connections C1 and C2), the insertion losses $L_{C1}$ and $L_{C2}$ are subtracted from the insertion loss $L_{total}$ of the measuring device 70:

$$L_{DUT} = L_{total} - L_{C1} - L_{C2}$$

with the losses given in logarithmic units. If the losses are given in linear units, taking the ratio is required accordingly.

In case that the measuring device 70 is optically reciprocal, i.e. the response signal will return into the direction of the source of the stimulus signal, it is normally sufficient to provide the reflectometric measurement only from one side of the measuring device 70, e.g. only from Port 1. In case of a non-reciprocal measuring device 70, reflectometric measurements from both sides of the measuring devices 70 are usually required, e.g. from Ports 1 and 2. It is thus clear, that in case of a reciprocal measuring device 70 and a determination of the insertion loss $L_{total}$ by means of the reflectometric measurement, the measurement instrument 10 only needs to be coupled to one side of the measuring device 70, e.g. only from Port 1. However, in case of non-reciprocal measuring device 70 and/or a determination of the insertion loss $L_{total}$ by means of a transmission measurement, both sides of the measuring device 70 have to be connected to measuring instrument 10 as depicted in FIG. 1A.

In case that the fibers 50 and 30 joined at connection C1 or the fibers 40 and 60 joined at connection C2 have substantially different backscatter coefficients, it is also of advantage to provide reflectometric measurements of the connection C1 and/or C2 from both directions (e.g. launching signals from the Port 1 for one and from the Port 2 for the other measurement). The relevant insertion loss for each connection C1/C2 can then be determined by the average of the insertion losses determined by the two measurements from both directions, as it is known from OTDR type measurements on fiber networks.

In a preferred embodiment, the measurement instrument 10 provides an interferometric characterization of the measuring device 70, as disclosed e.g. by David Sandel et.al. in "Optical Network Analysis and Longitudinal Structure Characterization of Fiber Bragg Grating", Journal of Lightwave Technology, Vol 16, No 12, December 1998. This method includes measuring at various optical wavelengths the output signal of an interferometer where the DUT is placed in one branch. The interferometer could be for example of Mach-Zehnder type for a transmittive DUT or of Michelson type for a reflective DUT. Examination of the wavelength (or better: frequency) dependent output signal by for example using a Fourier transformation allows a conversion of the measurement signal similar to the OTDR-trace as depicted in FIG. 1B. This way, the measurement data available for characterization of the measuring device 70 can also be used for characterizing the non-perfect connections C1 and C2. Thus, the insertion losses of the connections C1 and C2 can be obtained and treated separately from the properties of the DUT 20.

What is claimed is:

1. A method for determining an insertion loss ($L_{DUT}$) for a plurality of measuring wavelengths within a range of wavelengths for an optical component (20) having one or more connections (C1, C2), comprising the steps of:
   a) determining a connection insertion loss ($L_{C1}$, $L_{C2}$) for one or more of the connections (C1, C2) by means of a reflectometric measurement at a representative wavelength representative for the connection insertion loss ($L_{C1}$, $L_{C2}$) in the range of wavelengths,
   b) determining a total insertion loss ($L_{total}$) of the optical component (20) together with its one or more connections (C1, C2) for a plurality of measuring wavelengths within the range of wavelengths,
   c) determining, for each measuring wavelength, the insertion loss ($L_{DUT}$) of the optical component (20) from the determined total insertion loss ($L_{total}$) at that measuring wavelength and from each determined connection insertion loss ($L_{C1}$, $L_{C2}$) at the representative wavelength.

2. The method of claim 1, further comprising determining the insertion loss of the optical component by subtracting each determined connection insertion loss from the determined total insertion loss if the losses are given in logarithmic units, or by taking the ratio if the losses are given in linear units.

3. The method of claim 1, further comprising providing a transmission measurement for determining the total insertion loss of the optical component together with its one or more connections.

4. The method of claim 3, further comprising evaluating the ratio of optical signal intensities before and after passing the optical component together with its one or more connections for determining the total insertion loss.

5. The method according to claim 1, wherein determining the connection insertion loss ($L_{C1}$, $L_{C2}$) for one or more of the connections (C1, C2) by means of the reflectometric measurement at a representative wavelength representative for the connection insertion loss ($L_{C1}$, $L_{C2}$) in the range of wavelengths includes:
   providing the reflectometric measurement for a measuring path including the optical component, and
   determining from the reflectometric measurement the connection insertion loss ($L_{C1}$, $L_{C2}$) for each of the one or more connections within the measuring path.

6. The method according to claim 5, wherein determining from the reflectometric measurement the connection insertion loss ($L_{C1}$, $L_{C2}$) for each of the one or more connections within the measuring path includes:
   determining a first signal intensity in a close distance before one of the connections (C1, C2),
   determining a second signal intensity in a close distance after the one of the connections (C1, C2), and
   determining the connection insertion loss ($L_{C1}$, $L_{C2}$) for the one of the connections (C1, C2) by processing the determined first and second signal intensities, preferably by subtracting the second signal intensity from the first signal intensity.

7. The method according to claim 1, wherein the reflectometric measurement is provided by applying optical time domain reflectometry (OTDR), optical frequency domain reflectometry (OFDR), frequency modulated continues wave reflectometry, or optical coherence domain reflectometry.

8. A software program or product, preferably stored on a data carrier, for executing a method for determining an insertion loss for a plurality of measuring wavelengths within a range of wavelengths for an optical component having one or more connections when the software program or product is run on a data processing system such as a computer, the method comprising:
   determining a connection insertion loss for one or more of the connections by means of a reflectometric measurement at a representative wavelength representative for the connection insertion loss in the range of wavelengths;
   determining a total insertion loss of the optical component together with its one or more connections for a plurality of measuring wavelengths within the range of wavelengths; and
   determining, for each measuring wavelength, the insertion loss of the optical component from the determined total insertion loss at that measuring wavelength and from each determined connection insertion loss at the representative wavelength.

9. A system for determining an insertion loss for a plurality of measuring wavelengths within a' range of wavelengths for an optical component having one or more connections, comprising:
   means for determining a connection insertion loss for one or more of the connections by means of a reflectometric measurement at a representative wavelength representative for the connection insertion loss in the range of wavelengths,
   means for determining a total insertion loss of the optical component together with its one or more connections for a plurality of measuring wavelengths within the range of wavelengths, and
   means for determining for each measuring wavelength, the insertion loss of the optical component from the determined total insertion loss at that measuring wavelength and from each determined connection insertion loss at the representative wavelength.

* * * * *